April 5, 1949.  C. W. BERTHIEZ  2,466,197
TOOLHOLDER
Filed April 11, 1945
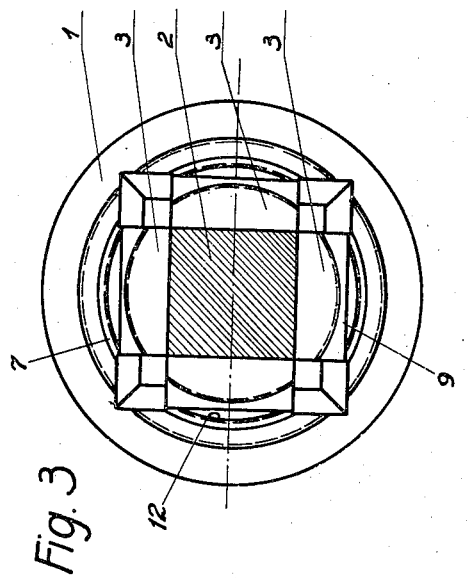
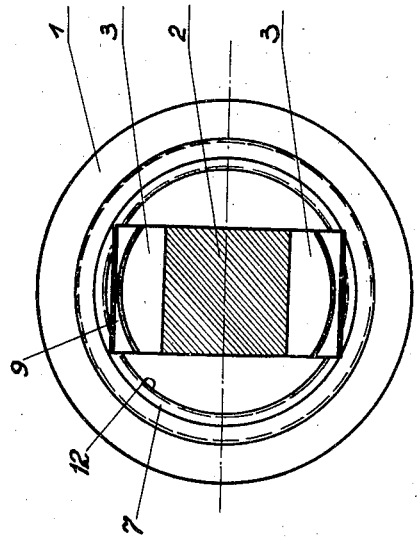
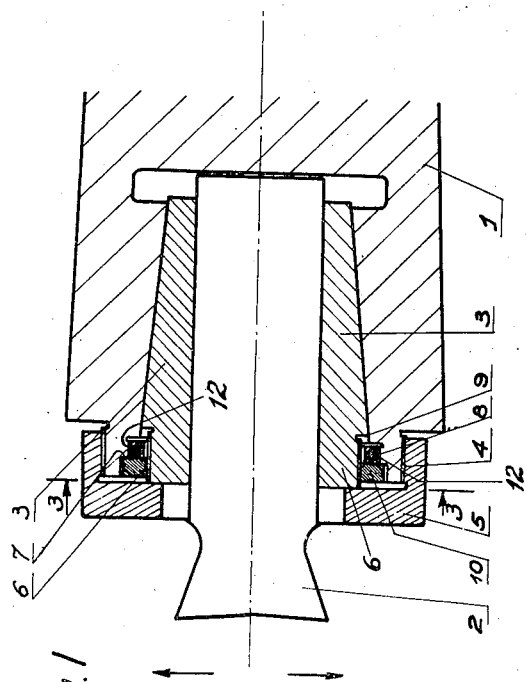
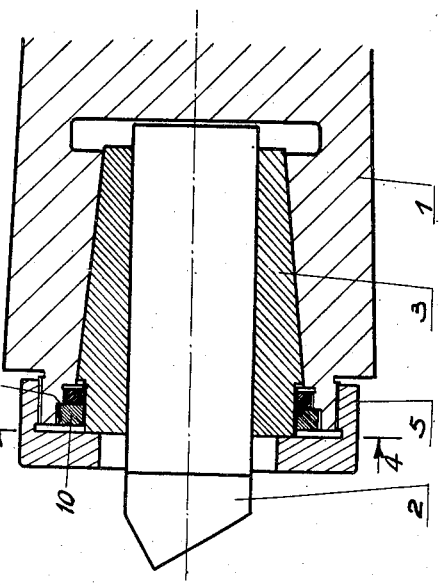
Charles William Berthiez
INVENTOR
By George H. Corey
His Attorney Patented Apr. 5, 1949

2,466,197

UNITED STATES PATENT OFFICE 2,466,197

TOOLHOLDER

Charles William Berthiez, Paris, France

Application April 11, 1945, Serial No. 587,772
In France October 12, 1943

9 Claims. (Cl. 29—96)

Machine tools such as slotting machines, planing machines, shaping machines, etc. are already known wherein the cut takes place bothin the forward and in the rearward direction of travel of the movable member of the machine. Among these machines, those which comprise a single tool capable of cutting in both directions of operation of the machine and mounted in a rockable tool carrier present a particular advantage as compared with those utilizing a separate tool for each direction of cut, due to the fact that they obviate the necessity of accurate adjustment of both tools, which adjustment must be effected by repeated trials, which may require much time in order to cause each of these tools to engage the work at exactly the same level and to strip off the same quantity of metal.

However, as the securing means commonly used for these tools (generally clamping screws) do not ensure them an absolutely rigid support the advantage derived from the use of a single tool becomes to a certain extent defeated since this absence of a rigid support involves the result that the cutting edges of said single tool are not necessarily situated, during both the forward and backward strokes, in the same plane, this being the necessary condition to cause the work to be engaged exactly at the same depth and the same quantity of metal to be stripped off. Therefore it is very difficult to obtain highly finished surfaces and particularly to complete the machining by a planing operation made up of wide cuts.

The present invention has for its object to remedy the above-stated disadvantage by the use of a single cutting tool secured in the tool carrier or holder in an absolutely rigid manner by means of a series of wedges accommodated in a recess in the tool carrier and abutted against two or more faces of the tool shank.

Another object of the invention is to provide means for securely, rigidly and yet removably holding a tool in the tool holder of a machine such as a machine tool, said means involving the use of perfectly plane, ground and hardened wedges cooperating with corresponding faces on the tool shank and in a wedge-receiving recess.

A further object of the invention is to provide tool-securing means as aforesaid comprising easily removable wedges temporarily but securely held in the recess of the carrier or holder by a bushing or like member cooperating with an abutment surface of the carrier.

With these and such other objects in view as will incidentally appear hereafter, the invention comprises the novel construction and combination of parts that will now be described more in detail in the continuation of this specification and with reference to the accompanying diagrammatic drawing exemplifying embodiments of the same and forming a part of the present disclosure.

In the drawing:

Fig. 1 is a sectional view of a tool mounted according to the invention in the tool carrier or holder of a machine tool of reciprocating type.

Fig. 2 is a sectional view taken on line 2—2 of Fig. 1.

Fig. 3 is a sectional view on line 3—3 of Fig. 2 with the locking means removed to show the arrangement of the wedges.

Fig. 4 is a view similar to Fig. 3 taken on line 4—4 of Fig. 2 and showing another embodiment of the invention.

As will be seen from Fig. 1, the tool carrier 1 or holder for a reciprocating type of machine tool (slotting machine, planing machine, shaping machine, etc.) carries in a pyramidal recess of polygonal cross section having its faces extending obliquely to the carrier axis a tool 2 which permits a cutting stroke to be effected in both operational directions of the machine. The shank of such tool in the illustrated embodiment has a square cross section as will be seen in particular from Figs. 3 and 4 while the four faces of the tool shank are so ground as to be perfectly plane and parallel to each other.

According to the invitation, each face of the tool shank is in intimate contact with the planar hardened and ground face of one of four wedges 3 (see Fig. 3) whose opposite faces are also planar, hardened and accurately ground so as to have a precise fit with the four faces of the pyramidal recess of the tool carrier 1.

The end 4 of the tool carrier 1 is formed with a screw-threaded circular shouldered portion adapted to receive a flanged locking ring or bushing 5 whose inner circumference is screw-threaded, said locking ring or bushing being adapted to simultaneously clamp the four wedges 3 against the faces of the pyramidal recess and against the faces of the tool shank while abutting the latter against the bottom of said recess.

An inner screw-threaded portion 12 of the tool carrier 1 permits a threaded retainer 8 to be screwed into position, this retainer holding the several wedges by cooperating with a retaining shoulder 9 provided on each wedge, thereby avoiding the complete withdrawal of the said wedges when removing the tool from the carrier.

The end 6 of each of the four wedges 3 is formed with a circular threaded shouldered portion capable when the four wedges are in place in the holder with the tool of receiving a nut 10 for extracting the wedges, said nut bearing against the face of the shoulder 7 of the tool carrier 1 or against the retainer 8 as the nut is screwed inwardly to exert pull on the wedges when the tool is being removed. This nut may be mounted on the outer end 6 of the wedges 3 so as to be retained thereon when the wedges are removed from the holder.

Where in the cutting strokes the side reactions of the tool 2 in the carrier or holder 1 are small, it is possible, as a measure of simplification, to secure the tool 2 only by means of a pair of wedges 3 at two opposite faces of the tool shank, as shown on Fig. 4, and wedging against two opposite faces of the tapering recess.

In order to fix the tool in the carrier 1, the locking ring 5 is removed and the nut 10 is backed off somewhat on the wedges. The locking ring may then be replaced and the tool introduced into the pyramidal recess of the tool carrier 1. As in most such machine tools the carrier 1 is arranged so that the tool extends downwardly toward the workpiece, the wedges 3 are supported on the retainer 8 from falling out of the recess until the tool is abutted against the bottom of the recess in the tool carrier 1. The tool shank should be held abutted against the bottom of the recess while the locking ring is being screwed up, said locking ring simultaneously wedging the four wedges against the tool.

In this manner a particularly strong clamping action and rigidity of the tool in the tool carrier are secured. This makes it possible, for the above-cited reasons, to impart to the surfaces which are being machined a high degree of finish owing to the strictly co-planar relation of the two cutting edges of the tool during the different cuts effected by the machine.

This device provides for an automatic setting of the re-sharpened tool or any other identical tool, the accuracy of correspondence of the two cutting edges amounting to one-hundredth of a millimeter by comparison with those of previously used tools.

It will be understood that while the present invention is capable of being applied with advantage to reciprocating machines, such as machine tools operating to produce cuts in both the forward and reverse directions, it is also applicable to machine tools or other machines operating with the cutting or other working stroke only in one direction. Moreover, the tool holder as above described also may be used for holding lathe tools, or in other machines in which relative rotary motion is utilized between the tool and the work piece, and generally for holding any tool in the tool carrier of any machine for the purpose of giving greater rigidity to the tool mounted in the tool carrier.

Obviously certain modifications of the device above described and shown in the accompanying drawing by way of example may be made as to its constructural details without departing from the general scope of the invention.

What is claimed is:

1. A tool carrier for a machine tool provided with a recess of polygonal cross section having faces extending obliquely to the axis of the carrier and defining inwardly tapering spaces between said faces and corresponding faces of the shank of a tool inserted in said recess, a shoulder on the carrier end adjacent the entry of said recess, accurately sized metallic wedges insertable into said spaces, said wedges having hardened faces which are ground to planar shape for tight interfit between the recess and tool faces, and removable locking means for inwardly driving the wedges into said spaces and abutting the inner tool shank end against the recess bottom, said locking means including a bushing engageable with the tool carrier shoulder.

2. A tool carrier for a machine tool, said carrier having a reduced end forming outer and inner shoulders, said carrier having a recess of polygonal cross section having faces extending obliquely to the axis of the carrier and defining inwardly tapering spaces between said faces and corresponding faces of the shank of a tool inserted in said recess, accurately sized metallic wedges insertable into said spaces, said wedges interfitting between the recess faces and said tool faces, removable locking means for inwardly driving the wedges into said spaces and abutting the inner tool shank end against the recess bottom, said locking means including a flanged bushing engageable with the outer shoulder of the tool carrier and with the outer end of said wedges, and wedge retaining means engageable with the wedges and the inner shoulder of the tool carrier.

3. A tool carrier for a machine tool provided with a recess of polygonal cross section having faces extending obliquely to the axis of the carrier and defining wedge shaped spaces between said faces and corresponding faces of the shank of a tool inserted in said recess, accurately sized and ground metallic wedges insertable into said spaces, a threaded shoulder in the wall of the recess, a screwed ring engageable with said shoulder, and shoulders on the wedges to cooperate with said ring and limit the outward motion of said wedges.

4. A tool carrier for a machine tool provided with a recess of polygonal cross section defining wedge shaped spaces between its faces and corresponding faces of the shank of a tool inserted in said recess, the lateral wall of said recess having a shoulder, metallic wedges tightly insertable into said spaces and having a threaded partly cylindrical outer end, a threaded portion on the outward end of the tool carrier, a locking ring engageable with said portion and abutting the outward end of the wedges, a nut engageable over the threaded ends of the wedges to rigidify their assembly, said nut being abutted against the recess shoulder, and means for limiting the outward motion of the wedges.

5. A tool carrier for a machine such as a machine tool of the reciprocating type provided with a recess of polygonal cross section having faces extending obliquely to the longitudinal axis of the carrier and defining spaces between said faces and corresponding faces of the shank of a tool inserted in said recess, the inner face of the lateral wall of said recess having outer and inner shoulders, metallic wedges tightly insertable into said spaces and spaced about said axis at angular intervals, each wedge having a shoulder and a threaded outer end in the form of a cylinder segment, a threaded cylindrical end portion integral with the carrier between said shoulders of said recess, a ring engageable with said carrier threaded portion and adapted to abut the wedge shoulder and the recess inner shoulder, a nut engageable over the threaded ends of the wedges to abut the recess outer shoulder, and a bushing having a flange engageable with the outer periphery of the carrier and engageable with the outer ends of said wedges for driving said wedges into said spaces.

6. A tool holder for a machine tool comprising a member for supporting a cutting tool having a shank providing oppositely disposed planar faces extending lengthwise of and parallel to the axis of said tool, said member having a recess extending inwardly from an end thereof for insertion of said tool, said recess being formed with oppositely disposed planar faces extending in the direction inwardly from said end of said member and obliquely respectively toward said planar faces of said tool inserted in said recess to form with said tool spaces tapering inwardly of said recess lengthwise of said tool, wedges respectively inserted in said spaces and provided with planar faces bearing respectively on said planar faces of said tool and upon said obliquely extending faces of said recess, and a locking ring threaded on the portion of said member adjacent the outer end of said recess and adapted to bear against said wedges adjacent the outer ends thereof for forcing said wedges lengthwise of said recess into clamping position in said recess upon screwing said ring on said threaded portion of said member.

7. A tool holder for a machine tool according to claim 6, said wedges adjacent their outer ends being provided with threads capable of receiving a nut when said wedges are assembled in face to face bearing relation to said tool, and a nut fitting in threaded relation to said assembled wedges and adapted for bearing upon said member adjacent the outer end thereof to effect movement of said wedges outwardly of said recess upon turning of said nut on said threaded wedges.

8. A tool holder for a machine tool according to claim 6, said member adjacent the outer end of said recess being formed with an internal shouldered portion, and a retainer threaded in said internal shouldered portion of said member and extending about said recess and the wedges inserted therein, said wedges being provided with a shoulder for engagement with said retainer to prevent movement of said wedges outwardly of said recess during insertion and removal of said tool.

9. A tool holder for a tool provided with a shank having planar faces extending parallel lengthwise of the tool shank comprising a member providing a recess extending inwardly from an end of said member, said recess being of pyramidal form with oppositely disposed faces of the pyramid converging inwardly of said recess in symmetrical relation to the axis of said pyramid and with said axis thereof extending parallel to said planar faces of the tool inserted in said recess, wedges insertable in the spaces respectively between said pyramidal faces and the adjacent tool faces and adapted to bear on said faces for clamping said tool in said holder when said wedges are moved inwardly parallel to the axis of the pyramid, and a locking ring threaded on the portion of said member adjacent the outer end of said recess and adapted to bear against said wedges adjacent the outer ends thereof for forcing said wedges lengthwise of said recess into clamping position in said recess upon screwing said ring on said threaded portion of said member.

CHARLES WILLIAM BERTHIEZ.

REFERENCES CITED

The following references are of record in the file of this patent:

UNITED STATES PATENTS

| Number | Name | Date |
| --- | --- | --- |
| 172,689 | Barrett | Jan. 25, 1876 |
| 980,309 | Marconini | Jan. 3, 1911 |
| 1,319,250 | Sarlandt | Oct. 21, 1919 |
| 1,636,898 | Bugatti | July 26, 1927 |
| 1,907,632 | Weber | May 9, 1933 |
| 1,973,942 | Buhr | Sept. 18, 1934 |
| 2,210,605 | Speckert | Aug. 6, 1940 |
| 2,337,663 | Jones | Dec. 28, 1943 |
| 2,377,519 | Rich | June 5, 1945 |
| 2,381,335 | Clare | Aug. 7, 1945 |